W. R. HUME.
MACHINE FOR MANUFACTURING PIPES, CONDUITS, AND THE LIKE.
APPLICATION FILED JAN. 13, 1914.
1,233,239.
Patented July 10, 1917.
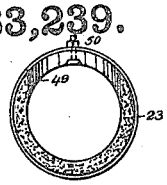
- FIG 12 -
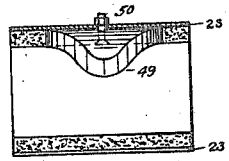
- FIG 13 -
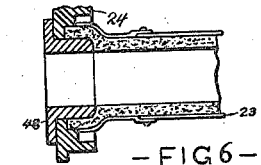
- FIG 6 -
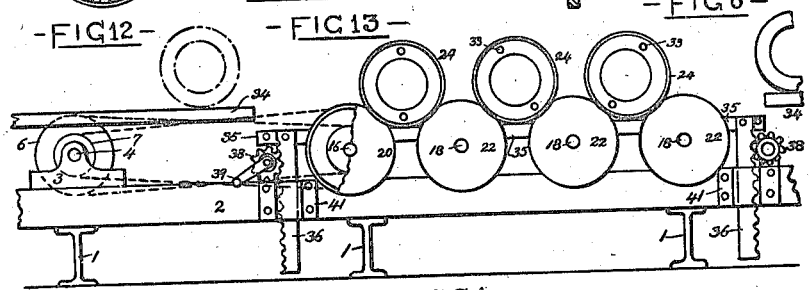
- FIG 1 -
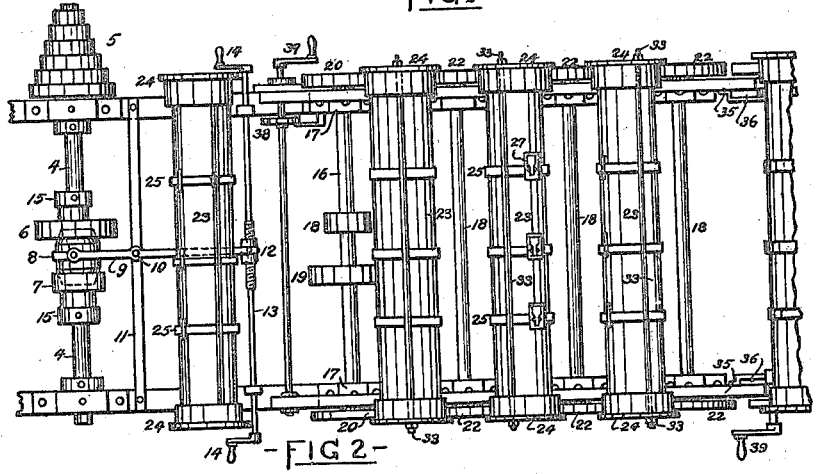
- FIG 2 -
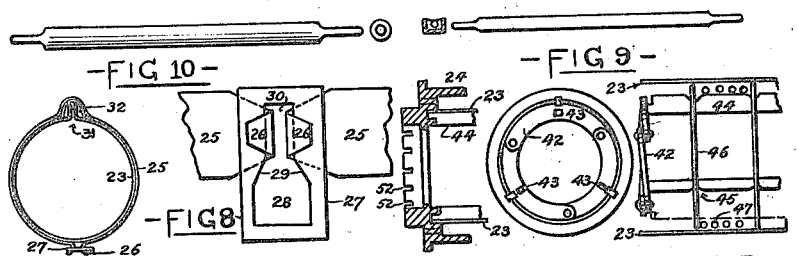
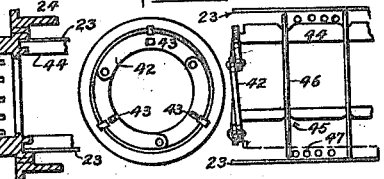
Witnesses.
Elsie Swenson
Ray J. Ernst.
Inventor:
Walter Reginald Hume
by Knight Bros.
Attorneys.

UNITED STATES PATENT OFFICE.

WALTER REGINALD HUME, OF ADELAIDE, SOUTH AUSTRALIA, AUSTRALIA.

MACHINE FOR MANUFACTURING PIPES, CONDUITS, AND THE LIKE.

1,233,239.   Specification of Letters Patent.   Patented July 10, 1917.

Application filed January 13, 1914. Serial No. 811,871.

*To all whom it may concern:*

Be it known that I, WALTER REGINALD HUME, a subject of the King of Great Britain, residing at Flinders street, Adelaide, in the State of South Australia, Commonwealth of Australia, have invented certain new and useful Improvements in Machines for Manufacturing Pipes, Conduits, and the like, of which the following is a specification.

My invention relates to an improved machine for manufacturing pipes, conduits, and the like, the object of the same being to provide a machine wherein hollow bodies such as pipes, conduits and the like can be manufactured by the aid of centrifugal force, such machine also comprising means whereby the pipes may be formed with socket ends and can be longitudinally or circumferentially divided into sections or short lengths, the former being suitable for short open conduits, while the latter can be used for collars for joining the ends of adjacent pipes. Means are also provided for smoothing the interior of the pipes during the process of manufacture, and for the removal of slurry from the interior after centrifugal action has ceased.

In my invention provision is also made for branch pipes placed at right angles or intermediate angles with the body of the pipe.

I will describe my invention by aid of the accompanying illustrated drawings where in—

Figure 1 is a side elevation of a portion of the machine,

Fig. 2 is a plan view of same,

Fig. 3 is a sectional end of casing or runner for pipes showing method of supporting longitudinal division plates, Fig. 4 end view of casing showing adjustable ring for supporting circumferential division plates.

Fig. 5 sectional side view of casing showing circumferential division plates in position, Fig. 6 sectional end view of casing runner for pipes having enlarged ends, Fig. 7 cross section of casing showing method of joining or closing abutting edges of casing.

Fig. 8 detail of cleat for attaching circumferential bands,

Fig. 9 is a channel shaped scraper for removing rough portions and surplus material from the interior of the pipe, Fig. 10 is a round surfaced trowel for smoothing the surface of the interior of the pipe, Fig. 11 is a scraper for removing slurry from the interior surface after the pipe has set, and Figs. 12 and 13 illustrate end and side views of plug for molding openings for right angle branch pipes.

Fig. 14 plug for molding branch pipes of 45 degrees.

In each of the illustrations similar letters of reference are used to denote similar or corresponding parts wherever they occur.

In the drawings and referring to Fig. 1 a series of rolled joists 1 are used to form a seating for the machine bed 2 upon which the main bearings 3 are mounted for the support of the main driving shaft 4 upon which the belt wheel 5 is fastened, and is connected with any conveniently placed motor.

At or near the middle of the shaft the driving pulley 6 is loosely mounted, and at a little distance therefrom the smaller driving pulley 7 is likewise securely fastened, both pulleys being recessed for the reception of the cone clutch 8 which is operated backward and forward by means of a clutch lever 9 pivoted at 10 to the cross bar 11, the opposite end of the bar being furnished with a nut 12 in which the screw threaded portion of the controlling speed shaft 13 operates, such shaft being rotated by means of conveniently placed handles 14 arranged at each side of the machine as will be readily understood on reference to Fig. 2 of the drawings, and by means of which said mechanism either the large pulley 6 or the small pulley 7 can be rendered operative.

The double ended cone portion 8 which forms the clutch rotates in unison with the driving shaft, being mounted upon a feather, and the loose wheels 6 and 7 abut against the fixed collars 15 when the cone clutch brings them into operation.

Parallel to the main driving shaft the subsidiary driving shaft 16 is mounted upon the bearings 17 at each side of the bed. This subsidiary shaft is furnished with fixed pulleys 18 and 19 placed opposite to the pulleys 6 and 7 but differing in diameter therefrom and connected thereto by belts (not shown in the drawings) whereby a change of speed is easily obtained.

The subsidiary driving shaft has frictional driving wheels 20 fastened to its outer ends, and parallel to the shaft 16 a series of other shafts which I call driven shafts 18 each provided at its ends with frictional driven wheels 22 of similar size and character to the shaft 16 and the wheels 20 are mounted, but belt wheels are not arranged in connection therewith.

The casings in which the pipes are molded are shown at 23, and consist of sheet metal fitted into a flanged wheel or runner 24, which is also clearly shown in section in Fig. 6 of the drawings. The casings are circumferentially bound by the bands 25, the ends of such bands being beveled and turned over at 26, more clearly shown in Fig. 8 of the drawings so as to be gripped by the cleat 27 which is characterized by having a comparatively large opening 28 at one end which recedes with wedge shaped or beveled edges 29 to a comparatively small opening 30. The ends of the circumferential bands, which are permanently bent backward as illustrated, are easily inserted in the opening 28, and the cleat is then tapped with a hammer so as to cramp the ends of the band into the smaller space 30, thereby tightly pulling the casing together.

Instead of allowing the adjacent edges of the casing to overlap they are bent upward at right angles as shown at 31 in Fig. 7, and are covered with a ridge plate 32 which said ridge plate is also incased by the circumferential bands 25 previously described. This covering of the edges with a small ridge plate is an important feature in my invention.

After the casings have been circumferentially bound and inserted in the flanged wheels 24 the complete case thus made is longitudinally bound together by the rods 33 of which there are preferably two to each casing.

For convenience of construction and for the better handling of the casings I construct parallel with and immediately above the main bed of the machine a ramp or rail 34, a portion of which marked 35 in the drawings is mounted upon vertically sliding standards 36, such standards having toothed edges to be operated upon by a toothed wheel 38 fitted with handle gear 39 whereby the moving portion of the ramp can be elevated or depressed as indicated in Fig. 1 of the drawings, suitable means (not shown on the drawings) being provided to hold the standard of the movable portion 35 when elevated to the height of the fixed portion 34. Guides are provided at 41 for steadying the vertical standards, and the traverse of the moving portion of the bar 35 is such that it can descend from a position in alinement with the portion 34 to a position immediately above the various shafts 16 and 18.

At each end of the molding case I provide an adjustable ring 42 (Figs. 4 and 5) preferably formed in three sections pivotally joined together as illustrated, and having holes therein 43 for the reception of the ends of divisional bars 44 (Figs. 4 and 5). These bars are recessed at intervals as indicated at 45 for the reception of the rings 46, which may be regarded as dividing the mold or casing into sections, the bars also serving the purpose of supporting the reinforcement wires 47.

My machine also provides means for the insertion of longitudinal reinforcement wires by forming a series of slots or recesses in a web on the outer face of the flanged wheel or runner 24. Such slots or recesses are illustrated at 52 in Fig. 3 of the drawings. Into these slots wires are inserted, and are carried from end to end of the casing, being fastened at each end and spaced according to the strength of the reinforcement required.

By means of this device my machine is capable of accomplishing two important results other than the mere molding of the pipes. By the use of the bars 44, particularly when arranged as in Fig. 3, a pipe may be longitudinally divided into sections during the course of manufacture in such a manner as to render it easy for being subsequently split along the line of bar so as to form open flumes or troughs, and when used in combination with the rings 46, the pipe can be divided into short lengths.

For the purpose of forming an enlargement in one or both ends of the pipe the casing of my machine is fitted with a bell-mouthed portion 48 (Fig. 6) in combination with the flanged wheel or runner 24. The recess formed for joining purposes can be either substantially rectangular or it may be cone shaped, and can be applied either as an integral portion of the flanged wheel or runner 24, or may consist of an extension of the casing which can be riveted on the main portion of the casing by small countersunk rivets 49.

For the purpose of making an opening in a length of pipe to enable a branch pipe to be inserted I form a plug of metal equal in thickness to the thickness of the pipe which is to be made and conforming to the curve of the casing. Such a plug suitable for forming holes for right angled branch pipes is illustrated in the sectional Figs. 12 and 13 as indicated by the reference numeral 49, the plug itself being held up to the casing by a counter-sunk bolt 50. In the construction of openings for right angled branch pipes the plug would appear perfectly round in plan with vertical edges as illustrated, but if required for branch pipes set at an angle other than a right angle the appearance of the plug will be somewhat different, as for instance a plug suitable for pipes to be inserted at an angle of 45° will in side elevation contour appear substantially as illustrated at 51 in Fig. 14.

After the pipes have been made and particularly in cases where plug pieces for branch pipes are used it is desirable that the interior should be scraped for the removal of what is termed "slurry" as well as for the removal of excrescences of cement and waste material. This can best be achieved by the aid of a scraper as illustrated in Fig. 11 comprising a shaft 53 which may be mounted in a convenient rest upon the machine or may be operated by hand, such shaft being provided with radiating spring scrapers 54 having upturned ends shown at 55 in Fig. 11 of the drawings. The scraper so formed may be fitted with detachable wearing shoes 56.

In the various classes of pipe which are made the thickness of the intended structure may be increased or decreased by the insertion at each end of the mold or casing of an interchangeable thickening ring such as that illustrated at 57 in Fig. 15 of the drawings. Rings of this description are made of various diameters and various thicknesses, and are characterized by being slotted at 58, the slot or cut being preferably placed diagonally to the sides of the ring in the manner usually employed in connection with spring rings for pistons for steam engines.

In using my invention the casings are set up substantially in the manner illustrated in the drawings, their abutting edges being covered by the ridge plate 32 and their ends incased in the flanged wheels or runners.

If the pipes are to be reinforced the reinforcement wires or frame are inserted inside of the casing, and a ring such as 57 in Fig. 15 suitable to the intended thickness of the structure is inserted inside of the flanged wheels or runners at each end, or the reinforcement may be inserted in the manner provided for with regard to Fig. 3 of the drawings.

The casing or casings are then placed upon the ramp 34 and traversed on to the moving portion 35 which has previously been elevated so as to receive them from the level of 34. By means of the bar 35 and the operative gear connected with it they are lowered down to their bearings upon the frictional driving wheels 20 and the driven wheels 22 where in combination with the various wheels they form a continuous frictional contact. Slow motion is then imparted to the machine from the main shaft and belt wheel which operates through the clutch 8 to impart slow motion from the small driving pulley 7 to the pulley 19. While the casings are slowly rotated by motion received from the frictional driving and driven wheels, the cement or other constructional ingredients of the pipes is thrown into the interior of the casing by means of an ordinary shovel, so that the material is evenly distributed under conditions of comparatively slow speed. The speed is gradually increased until the molding and setting of the particles is completed. Meanwhile all surplus material is removed by aid of the channel shaped scraper illustrated in Fig. 9, and subsequently the interior of the pipes are smoothed or dressed while in rotation by the round shaped trowel indicated in Fig. 10.

After a final rotation has been given to the pipes the machine is gradually slowed down and all surplus water is permitted to drain off, and the split ring 57 is removed. The casings are then bodily lifted to the level of the ramp 34 by means of the moving portion 35, and they can be then rolled clear of the working part of the machine so as to leave it free for the reception of a fresh supply of casings.

After the cement has been left sufficiently long to properly set, the casings are removed from the pipe by taking off the flanged wheels or runners and tapping the cleat 27 clear of the turned ends 26 of the bands 25, so that upon the ends passing into the larger opening 28 the cleat can be removed, thus leaving the bands and the casing to easily be expanded or opened sufficiently to enable the contents to be removed. In cases where plugs have been inserted to make provision for branch pipes, the bolts 50 must be taken out so that the plug can readily be released from the casing and the mold pipe, and a short length of pipe of smaller diameter but having an opening therein, can subsequently be inserted adjacent to the main opening so as to afford strength and to form a seat for the end of the branch pipe.

I claim:

1. In a machine for making pipes, conduits and the like, the combination with series of wheels mounted on parallel axes, the wheels on one axis being spaced from those on adjacent axes, molding casings provided with runners frictionally engaging the peripheries of the wheels on pairs of adjacent axes, and means for delivering power to the wheels on one of said axes, said molding casings being driven by means of said wheels and adapted to transmit power between said wheels on parallel axes.

2. In a machine for making pipes, conduits and the like, a fixed ramp or rail, a movable ramp or rail, means for raising and lowering said movable ramp or rail, mold supporting wheels arranged on parallel axes with spaced peripheries, and a mold journaled on the peripheries of said wheels and forming a connecting element therebetween, said movable ramp or rail being suitably disposed to raise and lower said mold relatively to said wheels.

3. In a machine for making pipes, conduits and the like, the combination of a fixed support, of mold supporting wheels journaled in said fixed support, a mold rotatably mounted on said wheels and transmitting power from some of said wheels to others of said wheels, and means movably mounted on said fixed support for raising and lowering said mold with respect to said wheels.

4. The herein described machine for manufacturing pipes, conduits and the like, comprising a bed plate having a series of parallel shafts mounted thereon, each shaft terminating with a wheel at each end, and a series of casings having flanged wheels or runners designed to fit between and operate upon and make frictional contact with the wheels connected with the parallel shafts, and a driving shaft having variable speed gear thereon for imparting rotary motion to the first of the series of such parallel shafts.

5. In a machine for making pipes, conduits and the like, the combination of a fixed support, of mold supporting wheels journaled in said fixed support, a mold rotatably mounted on said wheels and transmitting power from some of said wheels to others of said wheels, and means movably mounted on said fixed support for raising and lowering said mold with respect to said wheels, said raising and lowering means comprising a rail adapted to be moved into supporting engagement with said mold, a rack carried by said rail, and a pinion journaled in said fixed support and meshing with said rack.

In testimony whereof I have affixed my signature in presence of two witnesses.

WALTER REGINALD HUME.

Witnesses:
  WM. E. KNIGHT,
  WM. A. COURTLAND.